United States Patent [19]

Sato et al.

[11] Patent Number: 4,857,346

[45] Date of Patent: Aug. 15, 1989

[54] PROCESS FOR PREVENTING STALING OF STARCH-CONTAINING COMPOSITION

[75] Inventors: Akira Sato; Yasuo Sekizuka; Satoshi Saito, all of Kanagawa, Japan

[73] Assignee: Meiji Seika Kaisha Ltd., Tokyo, Japan

[21] Appl. No.: 25,536

[22] Filed: Mar. 13, 1987

[30] Foreign Application Priority Data

Mar. 13, 1986 [JP] Japan .................................. 61-53646

[51] Int. Cl.$^4$ ................................................ A21D 2/18
[52] U.S. Cl. ..................................... 426/321; 426/549; 426/653; 426/658
[58] Field of Search ............... 426/549, 321, 578, 658, 426/653

[56] References Cited

U.S. PATENT DOCUMENTS

| | | | |
|---|---|---|---|
| 2,009,440 | 7/1935 | Epstein et al. | 426/653 |
| 2,040,249 | 5/1936 | Epstein et al. | 426/19 |
| 4,291,065 | 9/1981 | Zobel et al. | 426/321 |
| 4,382,967 | 5/1983 | Koshida et al. | 426/96 |

*Primary Examiner*—Donald E. Czaja
*Assistant Examiner*—Mary S. Mims
*Attorney, Agent, or Firm*—Sughrue, Mion, Zinn, Macpeak & Seas

[57] ABSTRACT

A method for preventing staling of a starch-containing composition for foods and non-foods, which comprises adding an anhydrosugar and/or an anhydrosugar derivative to the composition. The method effectively and safely prevents or retards staling of the starch-containing composition due to retrogradation of gelatinized starch during long-term preservation.

2 Claims, No Drawings

PROCESS FOR PREVENTING STALING OF STARCH-CONTAINING COMPOSITION

FIELD OF THE INVENTION

This invention relates to a method for preventing staling of starch-containing compositions comprising starch or starch-containing grains including foods and non-foods. More particularly, it relates to a method for preventing staling of starch-containing compositions for foods or non-foods by adding an anhydrosugar and/or a derivative thereof.

BACKGROUND OF THE INVENTION

Starch-containing compositions for foods, such as confections, or non-foods, such as starch pastes and adhesives, comprising starch or starch-containing grains tend to undergo staling with time in consistency, palatability, and the like due to retrogradation of starch which had been gelatinized by heating when preserved in the presence of water in the composition, resulting in reduction of commercial value. Therefore, it is difficult to preserve these compositions for a long period of time or to transport them long distances.

Many attempts have been made in order to prevent or retard staling of the starch-containing compositions due to retrogradation of gelatinized starch contained therein. Conventionally proposed methods include addition of fatty acid monoglycerides, stearyl 2-lactate, lecithin, etc. to breads; addition of lecithin, fatty acid monoglycerides or natural gum rubber, etc. to confections, e.g., sponge cakes, crepes, etc.; addition of sucrose, dextrin, amylases, sorbitol, various starch sugars (syrups) or natural gum rubber to Japanese-style confections, e.g., rice cakes, rice pastes, etc. addition of amylases or surface active agents to boiled rice; and the like as described in U.S. Pat. Nos. 4,291,065 and 4,320,151. Addition of these additives is effective to some extent depending on the characteristics of the respective additive. In the field of non-food starch-containing compositions, e.g., starch pastes and adhesives, glycerin, formamide, etc. have been used as additives for preventing cracking due to drying or starch retrogradation.

However, the effects achieved by these conventional additives are still insufficient to prevent deterioration of the starch-containing compositions, and development of an additive which produces greater effects has been demanded.

Further, glycerin which has been conventionally added to non-food starch-containing compositions is a dangerous material to have about, and formamide is anesthetic to humans. Therefore, use of these additives requires special care for safety and hygiene.

SUMMARY OF THE INVENTION

Accordingly, one object of this invention is to provide a safe method for effectively preventing retrogradation of gelatinized starch of a starch-containing composition.

As a result of extensive investigations, it has now been found that anhydrosugars and/or derivatives thereof are greatly effective to prevent retrogradation of gelatinized starch, contained in a wide variety of starch-containing compositions, during preservation.

Accordingly, the present invention provides a method of preventing staling of a starch-containing composition, which comprises adding anhydrosugars and/or derivatives thereof to said composition.

DETAILED DESCRIPTION OF THE INVENTION

The starch-containing composition to which the present invention is applicable to not particularly limited and includes foods and non-foods (e.g., pastes, adhesives, etc.) comprising starch or starch-containing grains (preferably ground grains).

The anhydrosugar which can be used in the present invention includes 1,6-anhydro-D-glucose, 1,2-anhydro-D-glucose, 3,6-anhydro-D-glucose, 3,6-anhydro-L-galactose, 3,6-anhydro-D-galactose, 2,5-anhydro-D-mannose, 1,5-anhydro-D-ribose, and the like.

The anhydrosugar derivatives to be used in the present invention typically include o-methyl derivatives, such as 2-O-methyl-3,6-anhydro-L-galactose, methyl-3,6-anhydro-D-glucoside, 4-O-D-galactosyl-3,6-anhydro-L-galactose, O-3,6-anhydro-L-galactosyl-(1→3)-D-galactose, etc.

The anhydrosugars and the derivatives thereof can be prepared from naturally-occurring anhydrosugars and/or polysaccharides composed of anhydrosugars and/or anhydrosugar derivatives as constituting sugars by hydrolysis, extraction, and the like. They can also be obtained by pyrolysis of polysaccharides containing no anhydrosugars and/or anhydrosugar derivatives as constituting sugars (e.g., starch, etc.) or through chemical synthesis (cf. e.g., Methods in Carbohydrate Chemistry, Vol. II, p. 172–189 and p. 394–396 (1963), Academic Press Inc., New York).

The anhydrosugars or derivatives thereof according to the present invention can be employed in the same manner as sugars commonly employed in foods, such as sucrose, glucose, maltose, starch syrups, lactose, sorbitol, maltitol, etc. For example, in the case of preparing rice paste, refined rice flour is mixed with water and the resulting mixture is heated to gelatinize starch and then anhydrosugar and/or derivatives thereof is (are) added dividedly in several times with sufficient kneading. When preparation of sponge cake is intended, anhydrosugar and/or derivatives thereof is (are) added to egg and after well foaming the mixture is admixed with wheat flour and baked at 180° C. (cf. Seika Handbook, p. 190, 191, 258 and 259 (1965) Asakura Shoten, Tokyo). In the case of non-foods such as starch pastes, e.g., those for adhesive, sizing, warp sizing, printing, etc., starch is gelatinized by a normal pressure cooker method, a high pressure cooker method, a jet cooker method, etc. The thus-prepared starch paste is mixed with anhydrosugar and/or derivatives thereof so that the latter can be dispersed homogeneously. The anhydrosugars and/or anhydrosugar derivatives of the invention exhibit noticeable effects to prevent starch retrogradation or staling of starch-containing composition when used in substitution of the above-described conventional sugar additives.

The anhydrosugars and their derivatives to be used are not necessarily required to be purified to a high purity, and may contain impurities originating in raw materials or incorporated during preparation.

The amount of the anhydrosugars and/or anhydrosugar derivatives to be added can be readily determined by the skilled artisan depending on the kind of starch-containing composition of interest and its properties, and usually ranges from 0.3 to 50% by weight, and preferably from 0.5 to 30% by weight based on the composition. If the amount of anhydrosugars and/or anhydrosugar derivatives is less than 0.3% by weight, sufficient effects cannot be produced, while amounts exceeding 50% by weight are unfavorable from the standpoint of palatability as well as cost incurred. In this connection, amounts not greater than 30% by weight are most practical.

The present invention will now be illustrated in greater detail with reference to the following test examples and working examples, but it should be understood that the present invention is not limited thereto. In these examples, all the parts and percents are given by weight unless otherwise indicated.

TEST EXAMPLE 1

Test in Potato Starch/Sugar/Water System

One hundred parts of potato starch, A parts (indicated in Table 1) of 1,6-anhydro-D-glucose and/or methyl-3,6-anhydro-D-glucoside, (100-A) parts (indicated in Table 1) of sucrose, and 150 parts of water were mixed, and the mixture was concentrated by heating over an open fire so as to have a final water content of about 40%. The resulting concentrate had an incipient hardness of 31 g/cm$^2$ as measured by a rheometer.

The concentrate was put in a petri dish, covered with a polyethylene film, and preserved in a refrigerator (below 10° C.) for accelerated staling. The degree of staling was determined from the increase in hardness as measured by a rheometer (RDR-1500 model, manufactured by Iio Denki K.K.) and X-ray diffractometry. The results obtained are shown in Table 1. In Table 1, "aging period" is the number of days having elapsed until obvious staling was observed, i.e., until the hardness exceeded a level double the incipient hardness. As a control, a composition containing sucrose as a sole sugar component was used.

TABLE 1

|  | Control | Sample No. 1 | Sample No. 2 | Sample No. 3 | Sample No. 4 | Sample No. 5 |
|---|---|---|---|---|---|---|
| Composition (part): |  |  |  |  |  |  |
| 1,6-Anhydro-D-Glucose | 0 | 1.6 (ca. 0.5%) | 10 (3.3%) | 0 | 25 (7.6%) | 50 (15.2%) |
| Methyl-3,6-Anhydro-D-Glucoside | 0 | 0 | 0 | 10 (3.3%) | 25 (7.6%) | 50 (15.2%) |
| Sucrose | 100 | 98.4 | 90 | 90 | 50 | 0 |
| Potato Starch | 100 | 100 | 100 | 100 | 100 | 100 |
| Rheometrical Hardness (g/cm$^2$) | 63 | 59 | 62 | 63 | 58 | 61 |
| Aging Period (day) | 1 | 2 | 8 | 8 | 31 | >70 |

Note: The rheometrical incipient hardness of the control was 31 g/cm$^2$.

As can be seen from Table 1, the anhydrosugar and/or derivative thereof according to the present invention, when added to a starch-containing composition in an amount of 0.5% (Sample No. 1), 3,3% (Sample Nos. 2 and 3), 15.2% (Sample No. 4), or 30.4% (Sample No. 5), extends the aging period 2, 8, 31, and 70 times, respectively, demonstrating significant inhibitory effects on staling of the starch-containing composition. Inhibitory effects on starch were revealed by X-ray diffractometry.

TEST EXAMPLE 2

Water was added to 100 parts of refined rice flour, and the solution was heated over an open fire to gelatinize the starch. 80 parts of sucrose and 20 parts of 1,6-anhydro-D-glucose (1,6AGlu) (Test Group 1) or methyl-3,6-anhydro-D-glucoside (M3,6AGlu) (Test Group 2) were added thereto, followed by heating so as to have a final water content of about 30% to prepare a rice paste.

The thus prepared rice paste was put in a petri dish, covered with a polyethylene film, and preserved in a refrigerator (about 5° C.) for accelerated staling. The degree of staling was evaluated by measuring the hardness by the use of a rheometer. The results obtained are shown in Table 2 below. Since all the test groups had substantially the same incipient hardness, the number of days having elapsed until the hardness exceeded a level double the incipient hardness is shown in Table 2 as "aging period". A composition using sucrose or maltose as a sole sugar component was used as Control Group 1 or 2, respectively.

TABLE 2

|  | Control Group 1 | Control Group 2 | Test Group 1 | Test Group 2 |
|---|---|---|---|---|
| Sugar Component (part): |  |  |  |  |
| Sucrose | 100 | — | 80 | 80 |
| Maltose | — | 100 | — | — |
| 1,6AGlu | — | — | 20 | — |
| M3,6AGlu | — | — | — | 20 |
| Hardness (g/cm) | 180 | 170 | 172 | 168 |
| Aging Period (day) | ½ | 2 | 28 | 28 |

The results of Table 2 prove that the anhydrosugar and derivative thereof according to the present invention exhibit remarkable effects to prevent staling of a starch-containing composition even at a low proportion of about 10%.

EXAMPLE 1

In the same manner as in Test Example 2, rice paste was prepared from 100 parts of refined rice flour, 40 parts of sugar, 40 parts (solid base) of a starch syrup, and 20 parts of methyl-3,6-anhydro-D-glucoside, and preserved in a refrigerator. The aging period of the resulting rice paste was 35 days whereas that of conventional rice paste prepared from refined rice flour and sugar is half a day, indicating the superior effect of the present invention on prevention of staling according to the present invention.

| EXAMPLE 2 | |
|---|---|
| Crepes were prepared from the following formulation: | |
| Wheat flour | 38 parts |
| Dry milk | 5 parts |
| Sugar | 5 parts |
| Egg | 30 parts |
| Margarin | 12 parts |
| 1,6-Anhydro-D-glucose | 10 parts |

The above components were mixed with an appropriate amount of water to form a dough. The dough was baked on a hot plate at 160° C. to make crepes.

For comparison, crepes were made in the same manner as described above except for replacing the 1,6-anhydro-D-glucose with sugar.

Both the crepes had satisfactory palatability immediately after the preparation with no noticeable difference in quality. However, when these crepes were packaged and preserved at room temperature (10° to 15° C.) for one week, the comparative crepes were crumbling with no elasticity (rheometrical hardness: 780 g/cm$^2$), while those containing 1,6-anhydro-D-glucose retained their elasticity and soft texture, and satisfactory palatability (rheometrical hardness: 400 g/cm$^2$).

As described above, the present invention can be widely applied to a variety of foods containing starch or ground grains containing starch, such as confections, e.g., sponge cakes, crepes, etc.; breads, buns or pastries; noodles; rice confections, e.g., rice cakes, rice pastes, etc.; fish-paste products; and the like. According to the present invention, staling of these foods in palatability or physical properties, such as consistency, ascribable to retrogradation of gelatinized starch during preservation can be markedly prevented or retarded. In addition, the anhydrosugars and/or derivatives thereof of the present invention are also effective on non-food starch-containing compositions, such as starch pastes, adhesives, and the like, to markedly prevent or retard deterioration or cracking after drying.

While the invention has been described in detail and with reference to specific embodiments thereof, it will be apparent to one skilled in the art that various changes and modifications can be made therein without departing from the spirit and scope thereof.

What is claimed is:

1. A method for preventing staling of a starch-containing food composition, comprising adding thereto, in an amount of from 0.3 to 50% by weight based on the food composition, a material selected from the group consisting of 1,6-anhydro-D-glucose, 1,2-anhydro-D-glucose, 3,6-anhydro-D-glucose, 3,6-anhydro-L-galactose, 3,6-anhydro-D-galactose, 2,5-anhydro-D-mannose, 1,5-anhydro-D-ribose, 2-O-methyl-3,6-anhydro-L-galactose, methyl-3,6-anhydro-D-glucoside, 4-O-D-galactosyl-3,6-anhydro-L-galactose, O-3,6-anhydro-L-galactosyl-(1–3)-D-galactose and mixtures thereof.

2. A starch-containing food composition comprising a starch-containing food and in an amount effective to inhibit retrogradation of starch, a material selected from the group consisting of 1,6-anhydro-D-glucose, 1,2-anhydro-D-glucose, 3,6-anhydro-D-glucose, 3,6-anhydro-L-galactose, 3,6-anhydro-D-galactose, 2,5-anhydro-D-mannose, 1,5-anhydro-D-ribose, 2-O-methyl-3,6-anhydro-L-galactose, methyl-3,6-anhydro-D-glucoside, 4-O-D-galactosyl-3,6-anhydro-L-galactose, O-3,6-anhydro-L-galactosyl-(1–3)-D-galactose and mixtures thereof.

* * * * *